（12） United States Patent
Ashdown

(10) Patent No.: US 8,798,474 B2
(45) Date of Patent: Aug. 5, 2014

(54) METHOD AND APPARATUS FOR COMMUNICATION IN AN ILLUMINATION SYSTEM USING A LIQUID LENS

(75) Inventor: Ian Ashdown, West Vancouver (CA)

(73) Assignee: Koninklijke Philips N.V., Eindhoven (NL)

( * ) Notice: Subject to any disclaimer, the term of this patent is extended or adjusted under 35 U.S.C. 154(b) by 641 days.

(21) Appl. No.: 12/920,472

(22) PCT Filed: Feb. 12, 2009

(86) PCT No.: PCT/IB2009/050588
§ 371 (c)(1),
(2), (4) Date: Sep. 1, 2010

(87) PCT Pub. No.: WO2009/112959
PCT Pub. Date: Sep. 17, 2009

(65) Prior Publication Data
US 2011/0008062 A1 Jan. 13, 2011

Related U.S. Application Data

(60) Provisional application No. 61/035,278, filed on Mar. 10, 2008.

(51) Int. Cl.
*H04B 10/00* (2013.01)
*H04B 10/04* (2006.01)

(52) U.S. Cl.
USPC .......................................... 398/118; 398/201

(58) Field of Classification Search
USPC ........... 398/118–131, 201; 359/253, 272, 290
See application file for complete search history.

(56) References Cited

U.S. PATENT DOCUMENTS

| 2,062,468 | A | * | 12/1936 | Matz | 359/291 |
| 6,449,081 | B1 | * | 9/2002 | Onuki et al. | 359/245 |
| 6,637,888 | B1 | | 10/2003 | Haven | |
| 2003/0147651 | A1 | * | 8/2003 | Roes et al. | 398/108 |
| 2005/0099220 | A1 | * | 5/2005 | Sato | 327/337 |
| 2005/0122559 | A1 | * | 6/2005 | Reboa et al. | 359/253 |
| 2008/0107419 | A1 | * | 5/2008 | Won | 398/130 |

FOREIGN PATENT DOCUMENTS

| WO | 9918456 A1 | 4/1999 |
| WO | 2006046185 A1 | 5/2006 |
| WO | WO 2006046185 A1 * | 5/2006 |
| WO | 2009069380 A1 | 6/2009 |

* cited by examiner

*Primary Examiner* — Daniel Dobson
(74) *Attorney, Agent, or Firm* — Yuliya Mathis

(57) ABSTRACT

A method and apparatus for communicating information content by modulation of light in an illumination system via a liquid lens optically coupled to the illumination system and capable of modulation of light thereof, using resonant modes of the liquid lens. A modulation control system operatively coupled to the liquid lens and to the information content is configured to represent at least a portion of the information content as a time-varying configuration of the liquid lens, the time-varying configuration substantially including one or more of said one or more resonance modes. A receiver system optically coupled to the liquid lens is configured to reconstruct at least a portion of the information content from light modulated by the time-varying configuration of the liquid lens.

8 Claims, 4 Drawing Sheets

02

A

22

B

METHOD AND APPARATUS FOR COMMUNICATION IN AN ILLUMINATION SYSTEM USING A LIQUID LENS

TECHNICAL FIELD

The present invention pertains to illumination systems. More particularly, various inventive methods and apparatus disclosed herein relate to a method and apparatus for communicating information in an illumination system using a liquid lens.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications, including ambient lighting, signage, advertising, display lighting, and backlit lighting. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Due in part to advances in LED technology, illumination systems directed toward lighting applications such as those listed above are progressively becoming more sophisticated. For example, an illumination system can be provided which can control the color and intensity of multiple LEDs in a lighting system in response to real-time inputs. Furthermore, multiple illumination systems may coordinate to provide expanded functionality. As the level of sophistication of illumination systems increases, it becomes feasible and beneficial to integrate illumination and communication features into a single system. Such integrated communication can be useful, for example for feedback purposes within an illumination system, or for coordination of multiple illumination systems.

One approach to the integration of illumination and communication functionality in a single system is to use at least one LED as a source of both illumination and information. This approach reduces cost and complexity of the system by using the radiant flux emitted by an LED to transmit information instead of a second signal source, such as an antenna or other communication device. For example, some conventional techniques contemplate direct modulation of a fluorescent light source for communication purposes by modulating the light source drive current to transmit information through an optical medium.

However, direct modulation of LEDs, such as is obtained by modulation of a drive current, can be inferior for some LED-based lighting systems. For example, although the radiant output of high-flux LEDs can be directly modulated at rates of up to several tens of megahertz by varying their electric drive currents, this approach may involve significant power losses during the modulation process if a time-varying signal is superimposed on an otherwise constant drive current. This direct modulation of LEDs can also be inefficient if the LED die is coated with phosphors that may have phosphorescence decay times of several milliseconds. In this situation, the radiant flux generated by the phosphors may need to be filtered in order to isolate the radiant flux (typically blue light) emitted by the pump LEDs, since it may be difficult to demodulate light emitted by the phosphors in this case.

Several conventional methods exist, however, for indirect control of light, which can be used for example to indirectly influence the radiant flux of light sources. For example a controllable lens or optical filter can be optically coupled to a light source, and the characteristics of said lens or filter can be varied, resulting in corresponding variation of light. Modulation of light in an illumination system through such indirect means could be advantageous due to increased energy efficiency.

For example, one method discloses a liquid lens with an electrically-controlled focus, comprising a light-transmitting liquid forming a lens interposed between two electrodes, the curvature of the surface of the liquid lens being controllable by varying the voltage between the two electrodes. Another conventional method uses a liquid lens as a light valve to modulate a dedicated light beam to record a sound track on photographic film. The method contemplates configuring the liquid lens surface as a single concave meniscus with variable concavity controllable by an applied voltage, and passing light through the lens onto photographic film. The variation of the lens concavity can cause corresponding variation in exposure intensity or exposure area on the photographic film, thereby recording information on the film. However, since only a single concavity is adjusted, a limited range of configurations can be used. In addition, precisely varying the concavity in time requires complex control circuitry. Yet another method discloses driving a liquid lens to produce standing or running waves on the surface thereof.

Thus, there is a need in the art to transmit information in an illumination system, using the liquid lens.

SUMMARY

The present disclosure is directed to inventive methods and apparatus for communicating information in an illumination system using a liquid lens, wherein the information content is encoded into a time-varying electrical signal suitable for inducing a liquid lens to produce variable illumination pattern in response to incident light, such that the information I can be at least partially decoded from the variable illumination pattern by a receiver system.

Generally, in one aspect, the invention focuses on an apparatus for communicating information content in an illumination system, which includes a modulation control system configured to encode a data stream representing the information content into a electrical signal suitable for inducing at least one liquid lens to produce a variable illumination pattern in response to incident light emitted by the illumination system, such that the information content is at least partially decodeable from the variable illumination pattern. In various embodiments, the apparatus includes a liquid lens operatively coupled to the modulation control system and capable of modulation of the incident light into the variable illumination pattern. The modulation may include generating a resonance mode within the liquid lens (320).

In some embodiments, the liquid lens includes one or more electrodes, the signal is a time-varying electrical signal, and the modulation control system applies the time-varying electrical signal to the one or more electrodes. The modulation control system can be configured to superimpose the time-varying electrical signal on a constant voltage applied to the one or more electrodes. Also, the time-varying electrical signal can be configured to induce the liquid lens using a modulation selected from the group consisting of: an amplitude modulation (AM), a phase modulation (PM), an amplitude shift key modulation (ASK), and a phase shift key modulation (PSK).

In one embodiment, the apparatus further includes a receiver system optically coupled to the liquid lens, the receiver system being configured to decode at least a portion of the information content from the variable illumination pattern. The variable illumination pattern may include temporally variable levels of illumination.

Generally, in another aspect, there is provided an apparatus for communicating information content by modulation of light in an illumination system, the system comprising: a liquid lens optically coupled to the illumination system and capable of modulation of light thereof, the liquid lens having one or more resonance modes; a modulation control system operatively coupled to the liquid lens and receiving the information content, the modulation control system being configured to represent at least a portion of the information content as a time-varying configuration of the liquid lens, the time-varying configuration substantially including one or more of said one or more resonance modes.

In some embodiments, the time-varying configuration includes an orientation of the liquid lens with respect to a light emitted by the illumination system and/or an electric potential at different points on a surface the liquid lens.

In one embodiment, the apparatus further includes a receiver system optically coupled to the liquid lens, the receiver system being configured to decode at least a portion of the information content from a light modulated by the time-varying configuration of the liquid lens. The receiver system may have a photosensitive surface configured to respond to the light by emitting a signal indicative of a property of the light; and a processing unit adapted to decode at least the portion of the information content from the signal. The processing unit may decode the portion of the information content using a look-up table.

In accordance with yet another aspect of the present invention, there is provided a method for communicating information content by modulation of light in an illumination system, the method comprising: providing a liquid lens optically coupled to the illumination system and capable of modulation of light thereof, the liquid lens having one or more resonance modes; and inducing a time-varying configuration of the liquid lens, the time-varying configuration substantially including one or more of said one or more resonance modes, the time-varying configuration representing information content as modulated light of the illumination system.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultra-violet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "illumination system" is used herein to refer to a system comprising lighting units and directed at least in part toward one or more lighting applications, including but not limited to ambient lighting, signage, advertising, display lighting, and backlit lighting applications. An illumination system may also refer to a naturally occurring system, comprising natural light. It is understood that light may comprise electromagnetic radiation of one or more frequencies, including but not limited to visible light. Therefore an illumination system may also refer to a system comprising microwave, x-ray, radio frequency, infrared, or other electromagnetic radiation either naturally occurring or directed toward an artificial purpose.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various embodiments of the present invention.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media. In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "reflection" or "reflected" is used herein to describe a phenomenon wherein a wave travelling through a medium reaches a new medium through which the wave cannot substantially travel. The wave at this interface is reflected and travels back into the original medium. For example, a light wave encountering a mirror, or a wave travelling through liquid encountering a solid can both exhibit reflection.

The term "refraction" or "refracted" is used herein to describe a phenomenon wherein a wave travelling through a medium reaches a new medium through which the wave can substantially travel, but at a different speed. The wave at this interface is bent and travels through the new medium in a new direction. For example, a light wave encountering glass, or a wave travelling through liquid encountering a new liquid can both exhibit refraction.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
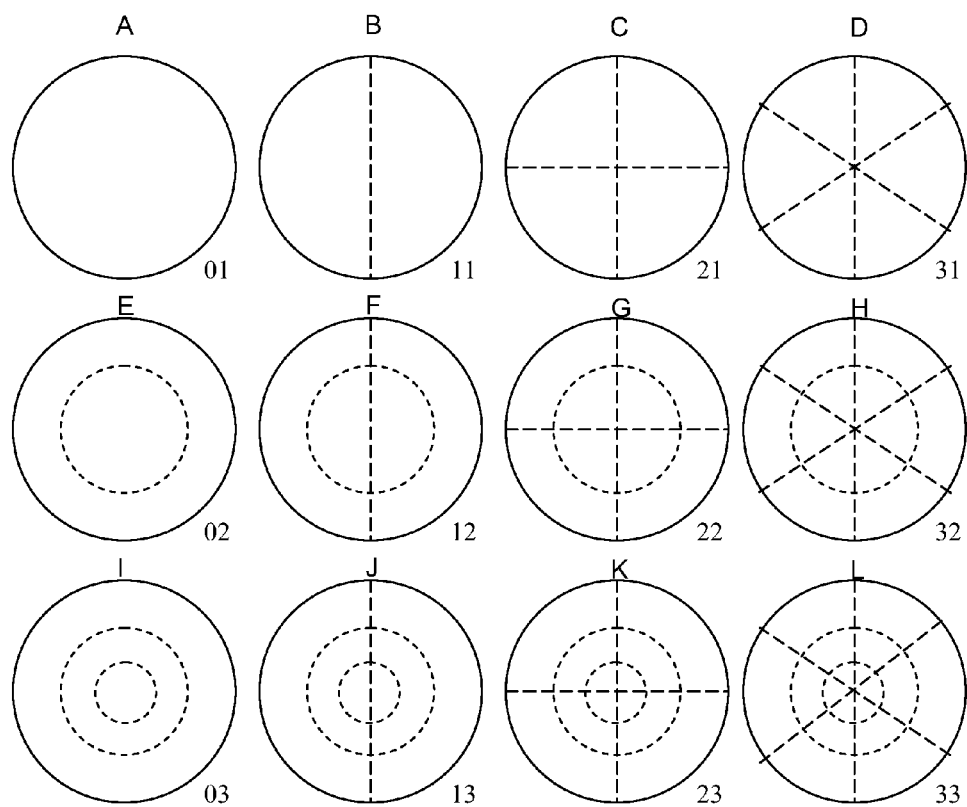
FIG. 1A to 1L diagrammatically illustrate the first few resonant modes of a liquid lens having a cylindrical configuration.

The present invention provides a method and apparatus for communicating information by modulation of light in an illumination system. For this purpose, a liquid lens is provided which can be optically coupled to the illumination system. In operation, modulation of the liquid lens can induce modulation of light in the illumination system for communication purposes. Due to construction, the liquid lens has one or more resonance modes which can be exploited for this purpose. A modulation control system, operatively coupled to the liquid lens and to information content, can be configured to influence the liquid lens so as to represent at least a portion of the information content as a time-varying configuration of the liquid lens, which in turn can induce the desired modulation of light. This time-varying configuration can substantially comprise one or more of the resonance modes of the liquid lens. The use of resonance modes, as described herein, can substantially improve communication of information.

In one embodiment, the present invention also comprises a receiver system, optically coupled to the liquid lens, such that the receiver system is at least partially illuminated by light which has been modulated by the liquid lens. The receiver system is configured to reconstruct at least a portion of the information content from light modulated by the time-varying configuration of the liquid lens. For this purpose, the receiver system can be configured to discriminate one or more of the resonant modes of the liquid lens.

Illumination System

The apparatus according to one embodiment of the present invention is adapted to operate in conjunction with LED-based lighting units disclosed above, which provides light to be modulated by the liquid lens. Although the invention disclosed herein can operate to communicate information when supplied with light from a dedicated LED light source, it is intended also to operate in conjunction with an LED forming part of an illumination system which is directed toward at least one other purpose in addition to communication. In some embodiments of the invention, an illumination system can include one or more LED light sources, a control unit for controlling one or more aspects of light emitted by these light sources, for example the amount and wavelengths of light emitted thereby, and a power source for supplying power to the LEDs. The illumination can also include optical elements such as lenses, filters, mirrors and diffusers for directing or modifying the light of one or more LEDs. The illumination system can further include an optional feedback system, which can measure one or more qualities of light emitted by one or more LEDs and convey this information to the control unit for feedback control purposes.

It is contemplated that embodiments of the present invention are also operable in conjunction with natural light, for example as can be found in a naturally occurring illumination system, or with any electromagnetic radiation falling outside of the normal visible spectrum, for example infra-red, microwave, x-ray, or radio waves. In many embodiments, the illumination system is directed toward a lighting application such as ambient lighting, signage, advertising, or display lighting. For example, the illumination system can include a plurality of controllable LED-based lighting units described above.

Liquid Lens

A liquid lens typically comprises a chamber containing one or more fluids proximate to one or more electrodes. The lens is configured such that light can pass through the liquid boundary, said boundary having refractive or reflective properties influencing the path of said light. By varying an electrical signal connected to the one or more electrodes, the shape of the liquid boundary can be changed due to a phenomenon known as electrowetting, thereby influencing the path of light passing through said boundary. Several versions of liquid lens have been contemplated in the art or are commercially available. For example, U.S. Pat. No. 2,062,468 discloses a liquid lens with an electrically-controlled focus, comprising a light-transmitting liquid forming a lens interposed between two electrodes, the curvature of the surface of the liquid lens being controllable by varying the voltage between the two electrodes. Other liquid lens devices are disclosed in International Patent Applications Publication Nos. WO 99/18456 and WO 03/069380, and U.S. Pat. No. 6,449,081. Commercially available products include the Arctic™ 320 and Arctic™ 416 liquid lenses manufactured by Varioptic SA (Lyon, France).

The path of light passing through the liquid lens can be influenced by varying the surface of the liquid lens, due to the phenomenon of refraction as would be readily understood by a worker skilled in the art. In one embodiment, it is known that the direction of light travelling through the surface of the liquid lens is changed in accordance with Snell's law, which characterizes the change in direction of light in terms of the angle at which light strikes the liquid lens surface. Therefore, by changing the orientation of the liquid lens surface with respect to the light, the direction of light passing through the lens can be influenced.

In one embodiment, the liquid lens includes an electrode in the shape of a tube defining a fluid chamber, the fluid chamber containing two immiscible fluids, including a conducting fluid and an insulating fluid, and an electrode inserted into the center of the tube, for example, similar to what is generally described in International Patent Application Publication No. WO 2006/046185. An insulator is also placed over one or more of the electrodes. The ends of the fluid chamber are sealed with transparent elements allowing light to pass through the chamber and the interface between the two fluids. By varying the voltage between the electrodes, a corresponding variation in the shape of the interface between the fluids can be induced, including the formation of standing and running waves.

A liquid lens of various shapes and sizes can be suitable for various implementations of the invention. For example, the lens may be shaped as a cylinder, cone, ellipse, toroid, rectangular prism, triangular prism, or other three-dimensional shape as would be readily understood by a worker skilled in the art. The shape of the liquid lens can influence its operation, such as refractive properties, potential lens configurations, and resonance modes. For example, the amplitude of some resonance modes can be increased by varying aspects of the liquid lens shape, such as the angle of the lens walls. Current liquid lens technology favours smaller lens sizes, since the effect of gravity on the liquids decreases with size. However, embodiments of the present invention can be operable with a lens of a variety of sizes.

In one embodiment, the liquid lens may have more than two electrodes, or suitable portions of the lens walls can be configured to have a controllable electric potential. In another embodiment, the liquid lens may comprise a surface, wherein the electric potential at different points on the surface can be varied in a controllable manner. In this manner, a broader range of time-varying electrical potentials may be induced, thereby inducing a correspondingly broader range of time-varying configurations of the liquid lens, including resonance modes. For example, the electric potential can be varied in a first area of the liquid lens, while the electric potential in a second area may remain constant. The second area may therefore comprise a surface which reflects incident waves generated in the fluid in a consistent manner.

In some embodiments, the liquid lens is a mechanically actuated liquid lens. Instead of relying on an electrical signal to vary the shape of the liquid lens surface, a mechanically actuated lens can vary the position of one or more of the liquid lens boundaries. The fluid containing region of the liquid lens may correspondingly vary in size and the surface of the liquid lens may then vary correspondingly in shape, due in part to the effects of surface tension.

In one embodiment, the liquid lens is a pressure actuated liquid lens. That is, the liquid lens includes a fluid and a gas within a lens cavity. By varying the pressure of the gas, the lens surface can be made to change shape. The shape of the lens surface can thereby be made to operate in accordance with embodiments of the present invention.

It is to be understood that the refractive index of the materials in the liquid lens can be varied as desired for different effects. For example, a fluid with higher refractive index can be used to achieve a higher gain when the lens is used to modulate light, since small variations in the lens shape can correspond with relatively large variations in the direction of light passing through the liquid lens. A reflective fluid can be used to reduce the amount of light passing through the lens surface when incident light is substantially perpendicular to the lens surface, but can allow light reaching the lens surface at a high incidence angle, for example when the liquid lens is operating in a resonance mode.

In some embodiments, multiple liquid lenses can be employed for modulation of light in an illumination system. Each liquid lens can be operatively coupled to a modulation system and operated in one or more resonance modes to modulate light. The liquid lenses can be further coupled with each other in series or parallel configurations, or a combination thereof, such that light passing through the collection of liquid lenses can be modulated for the purpose of communicating information in a desired manner.

In one embodiment, light incident upon a liquid lens can be optically manipulated by one or more devices as would be known to a skilled artisan. For example, light can be reflected using mirrors, passed through filters, lenses, or other optical elements as would be understood by a worker skilled in the art. Furthermore, light of the illumination system can be temporally varied using time-varying shutters or filters, strobed light sources, or the like to further modify light passing through a liquid lens.

Resonance Modes

A liquid lens generally comprises a fluid containing region defined by a boundary comprising a material different than the fluid of the liquid lens. A wave travelling through a fluid and reaching a boundary typically generates a reflection, comprising for example a wave travelling back into the fluid. The superposition of newly generated and reflected waves can generate resonance modes, for example standing wave patterns, at the surface of the liquid lens.

A resonance mode may be generally characterized as a mode of excitation of a wave-bearing medium exhibiting substantial constructive or destructive interference between two or more portions of one or more running waves present in the medium, wherein said portions are substantially coincident (superimposed) in time and space. A resonance mode may comprise a standing wave, a superposition of standing waves, a pulsed standing wave, a superposition of standing waves and running waves, or a time-varying combination of the above. For example, if a running wave generated by excitation of the wave-bearing medium is reflected at a surface, such as the wall of a liquid lens, such that a first portion of the running wave encounters a second portion of the running wave, the first and second portion may pass through each other, exhibiting constructive or destructive interference in a superposition of waves. Persistent resonance modes can be defined as resonance modes whose behaviour repeats periodically in time. Persistent resonance modes can be defined as a superposition of periodic waveforms over a predetermined time interval.

A resonance mode can leverage the superposition of reflected and non-reflected waveforms to induce patterns of higher amplitude or complexity than would be exhibited otherwise. Each resonance mode in a particular wave-bearing medium with prespecified boundaries can be induced by exciting the wave-bearing medium in a predetermined manner. A property of resonance modes in a bounded medium such as a liquid lens is that the excitation waveforms corresponding to each resonance mode are isolated from one another with regard to their frequency spectra. That is, there is no continuum of resonance modes in a bounded medium such as a liquid lens. Therefore each resonance mode can be recognizable as a distinct pattern.

Depending on the fluid medium, lens shape, and boundary conditions, many different resonance modes can be possible in a liquid lens. For example, a number of intricate vibration patterns such as Chladni patterns are known in the art which depict resonance modes in bounded media, as can be exhibited by a liquid lens. Resonance modes can also be predicted mathematically by solving an appropriate wave equation.

Figure 2:
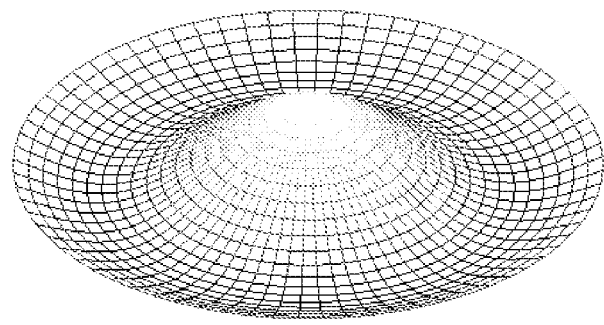
FIGS. 2A and 2B illustrate a three-dimensional perspective of two resonant modes of a liquid lens having a cylindrical configuration.
Figure 2:
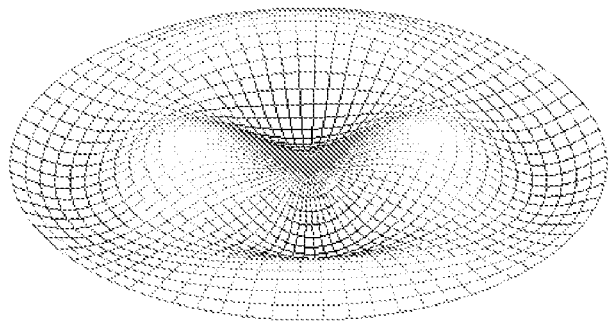

For example, the mechanical resonance for a cylindrical liquid lens according to one embodiment of the present invention may be approximated by modeling the lens surface as a thin circular plate with a clamped boundary and solving for the traverse standing waves using a wave equation which can be defined as follows:

$$\nabla^2 \psi(r, \varphi, t) = \frac{\partial^2 \psi(r, \varphi, t)}{v^2 \partial t^2} \quad (1)$$

where r is the radius, ϕ is the radial angle, t is time, υ is the longitudinal speed of propagation of traverse waves across the liquid interface, and ψ(r,ϕ,t) is the displacement amplitude of the wave. A number of standing wave patterns or Eigen-modes, which are resonant modes, are shown in FIG. 1A-1L, where nodal regions are indicated by broken lines, and regions on opposite sides of each nodal region are temporally displaced in opposite directions, for example by substantially sinusoidally varying displacement. FIGS. 2A-2B illustrate a three-dimensional representation of resonant modes 02 and 22 illustrated in FIGS. 1E and 1G, respectively, at an instant in time. These Figures illustrate is the pattern of displacement of adjacent areas in opposite directions.

Modulation Control System

The apparatus according to various embodiments and implementations of the present invention further includes a modulation control system operatively coupled to the liquid lens. As mentioned above, the modulation control system is configured to encode a data stream representing the information content into a electrical signal suitable for inducing at least one liquid lens to produce a variable illumination pattern in response to incident light emitted by the illumination system, such that the information content is at least partially decodeable from the variable illumination pattern. A liquid lens is operatively coupled to the modulation control system and capable of modulation of the incident light into the variable illumination pattern. For example, as also mentioned above, the modulation control system can be configured to change the shape of the liquid lens to convey information content by changing the pattern of light emitted by the illumination system.

In one embodiment, the liquid lens is used to collect and redirect the radiant flux emitted by one or more light-emitting elements such as one or more high-flux LEDs, such that a change in the lens shape can result in a change in the pattern of light on an illuminated surface, where a portion of the light passes through the liquid lens. By varying the signal applied to the one or more electrodes of the liquid lens, it can be possible to modulate the radiant flux emitted by the one or more light-emitting elements without significant power losses, and irrespective of phosphorescent decay rates.

In some embodiments of the present invention, a high frequency analog or digital modulation control signal is superimposed on a constant voltage applied to the one or more electrodes of a liquid lens. The constant voltage can be selected to appropriately condition or bias the lens for desired operation. If the modulation control signal corresponds to a resonance mode, for example if the signal comprises a frequency equal to an integer multiple of a fundamental mechanical resonance frequency of the liquid lens, the signal can cause small and rapid changes in the lens shape. For example, the Arctic™ 416 liquid lens produced by Varioptic SA of France can be changed over a range of −5 to +13 diopters in less than 500 milliseconds with the application of 33 to 46 volts DC. The mechanical resonance modes of the liquid lens depend on the lens geometry and constituent liquids.

The standing wave patterns or resonance modes induced by a superimposed signal can be determined in part by the electrical signal harmonics of the modulation control signal, which is a function of the signal waveform. For example, in one embodiment, a sinusoidal signal having only its fundamental frequency may only induce resonance mode 01, as depicted in FIG. 1A, wherein the liquid lens comprises a surface having a maximum deflection in the center, and which sinusoidally varies between concave and convex configurations. In other embodiments, the time-varying configuration substantially includes one or more resonance modes of a higher order than a 01 mode. A more complex signal, such as a square wave signal, can comprise a potentially large number of harmonics, or superimposed sinusoidal signals, which may induce resonance modes in a liquid lens interface having higher frequency components. Thus, changing the signal waveform can also result in a change in patterns of light at one or more points on an illuminated surface.

A change in the phase of the electrical signal can also result in harmonics that, depending upon the nature of the liquid interface, for example the mechanical damping thereof, may result in transient resonance modes in the liquid lens. Such transient modes can comprise a superposition of incident and reflective waveforms and hence may rely on resonance properties of the liquid lens. However, when a liquid lens is driven in a manner other than that which corresponds with the transient mode for a substantial time period, the transient mode may be substantially replaced with a new configuration of the liquid lens.

In one embodiment of the present invention, the amplitude, waveform, and/or phase of the electrical signal applied to the one or more electrodes of the liquid lens may be temporally changed or modulated in response to a data stream, such as for example binary data generated by external information content. The resultant temporal changes in the liquid lens shape can result in temporally varying levels of illumination at selected points on an illuminated surface. An optical receiver system situated thereon may therefore detect the transmitted data stream.

As will be recognized by those skilled in the art, there are many modulation techniques that may be applied by the electrical signal to the one or more electrodes of the liquid lens, including but not limited to amplitude modulation (AM), phase modulation (PM), amplitude shift key modulation (ASK), and phase shift key modulation (PSK), or other modulation techniques as would be readily understood by a worker skilled in the art. In general, signal modulation techniques that modify the amplitude, waveform, or phase of the signal may be applied without departing from the scope of the present invention.

In one embodiment, amplitude modulation or amplitude shift keying can comprise inducing a time-varying configuration of the liquid lens comprising one or more resonance modes, and varying the amplitude of the resonance modes to convey information. The amplitude can be varied in a continuous or discrete manner, so as to convey either analog or digital information. Continuous amplitude variation can correspond to amplitude modulation, whereas discrete amplitude variation can correspond to amplitude shift keying.

In one embodiment, phase modulation or phase shift keying can comprise inducing a time-varying configuration of the liquid lens comprising one or more resonance modes, and varying the phase of the resonance modes to convey information. The phase can be varied in a continuous or discrete manner, so as to convey either analog or digital information. Continuous phase variation can correspond to phase modulation, whereas discrete phase variation can correspond to phase shift keying. In one embodiment, the phase of a time-varying periodic configuration can be defined as a time shift between the periodic configuration completed and a reference periodic configuration. The time shift can be measured in fractions of the period in terms of degrees or radians. The value of this time shift can vary in time to convey information.

Variation of the amplitude or phase of a resonance mode in a liquid lens can, in one embodiment, induce transient configurations in the liquid lens. These transient configurations can be further used to identify variations in amplitude or phase by recognizing the characteristic patterns of light induced thereby.

For example, in one embodiment, a single resonance mode can be established initially having no phase offset with respect to a reference periodic configuration. The phase offset can then be varied in time substantially in proportion to the value of an input waveform representative of the information content.

In one embodiment, a reference phase can be transmitted by an additional resonance mode superimposed on an information-bearing resonance mode. The reference phase can temporally orient a receiver system so that phase changes in the information-bearing resonance mode can be compared to a reference, thereby allowing information to be transmitted using phase modulation.

In one embodiment, a programmable electronic device such as a microcontroller, computing device, or other device as would be understood by a worker skilled in the art, is associated partially or totally with the modulation control system to generate appropriate signals for desired control of the liquid lens. For example, a microcontroller including a central processing unit, memory, and analog or digital interfaces can be used to monitor information content and output a corresponding control signal for modulation of the liquid lens. An analog or digital interface can translate the information content into one or more signals passed to the central processing unit, which can execute instructions stored in memory to induce output of a control signal for modulation of the liquid lens.

In some embodiments, the programmable electronic device can be adapted to provide modulated periodic signals, for example as required by AM, PM, ASK, or PSK modulation, or other modulation scheme as would be understood by a worker skilled in the art. Electronic devices, for example devices adapted to provide modulated periodic signals, such as signal generators, frequency synthesizers, resonant circuits, delay circuits, voltage controlled oscillators, switches, amplifiers, or other devices as would be understood by a worker skilled in the art can be used to provide signals as required for modulation of the liquid lens according to a desired method.

In one embodiment, a plurality of liquid lenses, for example arranged in a serial configuration such that light passes through each lens in turn, can be modulated by the modulation control system to convey information. For example, a time-varying waveform comprising one or more resonance modes can be induced in each liquid lens, and the relative amplitude or phase in each lens can be varied in a predetermined manner in response to the information content.

Other modulation schemes may be used for the purposes of transmitting information by modification of a liquid lens, according to embodiments of the present invention. For example, each of the resonant modes illustrated in FIG. 1A-1L can be used to as a symbol to represent a portion of information content for transmission. For example, the first eight symbols depicted in FIG. 1A to 1H can be used to represent up to three bits of binary information. Communication can comprise varying the liquid lens between resonant modes in accordance with portions of the information content. For example, a receiver system can be configured to discriminate between said resonant modes by detection of nodal lines or regions having optical characteristics representative of differing phases of the liquid lens.

An advantage of communication using resonance modes can be that a liquid lens operated in this manner can exhibit a relatively high signal gain. For example, the superposition of waves in the liquid lens can exhibit constructive and destructive interference which can substantially increase the amount of displacement of regions of the liquid lens. Judicious timing of energy supplied to the liquid lens by the modulation control system can therefore cause relatively large deviations in the liquid lens using relatively small amounts of energy.

Another advantage of communication using resonance modes can be that the discrete nature of resonance modes can simplify communication operations. For example, since only certain signals applied to the liquid lens correspond to resonance modes, driving a liquid lens using similar but different signals can result in a relatively small response from the liquid lens. Therefore, errors or intermediate signals can often be disregarded since they may not correspond to a significant configuration of the liquid lens.

The modulation control system can further be adapted to perform other functions of a communication system as would be readily understood by a worker skilled in the art. For example, the modulation control system may further encode the information content for transmission using source coding or channel coding to adequately represent the information content for reliable and efficient communication. Such operations may be adapted to the configuration of the communication means described herein, namely light from an illumination system being modulated by one or more liquid lenses and detected by one or more optical sensors.

Information Content

The information content can comprise analog or digital information, for example binary data, which can be transmitted using one or more liquid lenses under control of the modulation control system.

In one embodiment, the information content comprises digital information, to which the modulation control system is adapted to respond in a predetermined manner. For example, portions of digital information such as groups of binary bits can be associated with a predetermined time-varying waveform by the modulation control system, according to a modulation scheme. The digital information can pertain to an aspect of the illumination system, for example to information generated by a controller in the illumination system.

In one embodiment, the information content comprises analog information to which the modulation control system is adapted to respond in a predetermined manner. For example, portions of analog information such as portions of a time-varying waveform can be used to direct the modulation control system according to a modulation scheme. For example, the value of the waveform at each time instant can be directed toward modifying the amplitude or phase of the time-varying waveform driving the liquid lens. The analog information can pertain to an aspect of the illumination system, or to a communication signal such as a modulated signal from another communication source.

In one embodiment, the information content includes information used for feedback control of the illumination system. For example, the illumination system can be operatively coupled to the information content for the purpose of passing information regarding the quality of light of the illumination system between components thereof. In another embodiment, the information content includes information used for coordination of multiple illumination systems, or multiple components of an illumination system. For example, a first illumination system can comprise a liquid lens and modulation control system adapted to transmit information pertaining to the operation of the first illumination system, and a second illumination system can comprise a receiver system illuminated by light modulated by the liquid lens, the receiver system adapted to receive information transmitted by the first illumination system.

Receiver System

In many embodiments of the present invention, the apparatus further comprises a receiver system, illuminated by at least a portion of light of the illumination system, including a portion of light modulated by the liquid lens. The receiver system can be configured to respond to light modulated by the time-varying configuration of the liquid lens so as to recover at least a portion of the information content encoded therein.

In one embodiment, a programmable electronic device such as a microcontroller, computing device, or other device as would be understood by a worker skilled in the art, is associated partially or totally with the receiver system to compare, decode or evaluate at least a portion of information content based on the configuration of light modulated by the liquid lens. For example, a microcontroller including a central processing unit, memory, and analog or digital interfaces can be used to monitor electrical signals indicative of light sensed by the receiver system and output a signal conveying information related to information content used for modulation of the liquid lens. An analog or digital interface can translate the electrical signals indicative of light sensed by the receiver system into one or more signals passed to the central processing unit, which can execute instructions stored in memory to induce output of a signal conveying information.

In one embodiment, the central processing unit translates electrical signals indicative of sensed light into a signal conveying information using a look-up table stored in memory. Electrical signals indicative of light are associated with a corresponding portion information content stored in memory by the central processing unit. Comparison and matching algorithms can be used, for example to match an electrical signal indicative of sensed light to a nearest or most likely portion of information content stored in memory. Interpolation algorithms can also be used for matching, or for generating a signal conveying a portion of information content other than those stored in memory.

In some embodiments, the programmable electronic device can be adapted to provide demodulation of periodic signals, for example as required by AM, PM, ASK, or PSK demodulation, or other demodulation scheme as would be understood by a worker skilled in the art. Electronic devices, such as signal generators, frequency synthesizers, signal multipliers, digital signal processors, voltage controlled oscillators, phase-locked loops, filters, feedback circuits, switches, amplifiers, or other devices as would be understood by a worker skilled in the art can be used for demodulation of the liquid lens according to a desired method.

The receiver system may have a flat or curved photosensitive surface, such as a surface having one or more photosensors, such as silicon photodiodes, arranged thereupon. The photosensors or photosensitive surface can be configured to respond to incident light by emitting a signal indicative of a property of said incident light. For example, a photosensor may provide an electrical signal proportional to the intensity or radiant flux of incident light in a predetermined range of wavelengths. Light, modulated by the liquid lens and incident on the photosensitive surface, can thereby be discriminated in terms of time-varying radiant flux thereof at one or more locations. Also, a photosensor can be fitted with an optical filter. For example, an optical filter may be provided which passes light comprising wavelengths substantially the same as the wavelengths of light being modulated by the liquid lens, thereby aiding in discrimination of the modulated light.

The receiver system can also include one or more devices operatively coupled to the output of the one or more photosensors, which are adapted to recover at least a portion of the information content transmitted via the liquid lens. For example, devices configured for this purpose may include but are not limited to low-pass, bandpass, or high-pass filters, time-varying signal gates, integrators, analog-to-digital converters, digital signal processors, FPGAs, demodulator circuits, or other device as would be known to a worker skilled in the art.

As disclosed above, in various embodiments, information is communicated by modulating at least a portion of light generated by the illumination system by inducing a time-varying configuration in the liquid lens. The modulated light is incident on a surface comprising a photosensitive receiver system, which is configured to extract information by discriminating patterns in the modulated light and ascribing meaning to said patterns in a predetermined manner. Depending on the configuration of the receiver system, patterns can be discriminated by spatial discrimination, time discrimination, or a combination thereof. For example, a receiver system can comprise an array of photosensors, the relative intensities of light incident thereupon representing a spatial pattern across the array of said photosensors. Alternatively, the receiver system can comprise one or more photosensors for discrimination of time-varying intensity of light in a localized region, the intensity of light being substantially uniform across said region, the time-varying intensity of light incident thereupon representing a temporal pattern to be discriminated by the receiver system.

In one embodiment, the temporal or spatial pattern, or a combination thereof, of the modulated light, for example of the radiant flux thereof, which can be substantially detected by the one or more photosensors, can be decoded in a predetermined manner into data, for example a binary sequence. For a receiver system which can adequately and reliably discriminate between various patterns of radiant flux corresponding to various configurations of the liquid lens, a communication link can be established by configuring the modulation control system to encode each portion of data into a prespecified time-varying configuration of the liquid lens, detecting a corresponding time-varying pattern at the receiver system, and decoding said pattern to recover the portion of data.

The invention will now be described with reference to specific examples. It will be understood that the following examples are intended to describe embodiments of the invention and are not intended to limit the invention in any way.

EXAMPLES

Example 1

Figure 3:
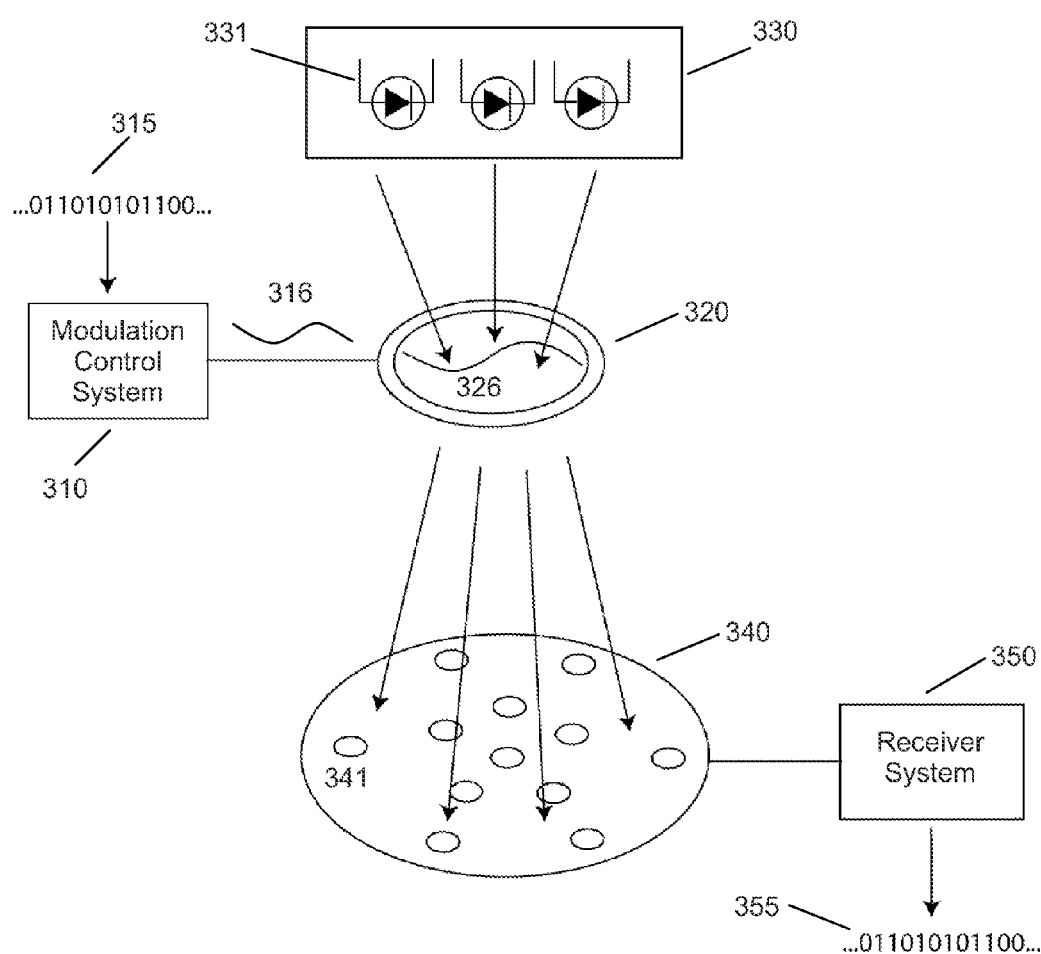
FIG. 3 illustrates a communication system according to one embodiment of the present invention.

FIG. 3 illustrates a communication system comprising a liquid lens modulating light in an illumination system according to one embodiment of the present invention. A modulation control system 310 is configured to read an information content 315, for example through electronic means (not shown), and output a time-varying electrical signal 316 representative thereof. The modulation control system 310 is further operatively coupled to a liquid lens 320. The time-varying electrical signal 316 is fed to the electrodes of a liquid lens 320, the signal 316 being configured to induce a corresponding time-varying configuration 326 of the surface of the liquid lens, the time varying configuration 326 comprising one or more resonant modes. In this manner, the information content 315 is encoded as a three-dimensional time-varying configuration 326 of the liquid lens.

The liquid lens is optically coupled to a light source 330 of an illumination system, the light source comprising light-emitting elements such as LEDs, for example an LED 331.

Light from the light source 330 passing through the liquid lens 320 is refracted by the surface thereof in a manner that varies with the time-varying configuration 326. This action modulates light passing through the liquid lens, which falls incident on a receiver surface 340. The receiver surface 340 comprises one or more photosensitive elements, such as element 341, configured to measure the time-varying intensity of light incident thereupon. The size and three-dimensional placement of the receiver surface 340, and the number and three-dimensional placement of the photosensitive elements thereof are selected such that light modulated by the liquid lens can be discriminated by the one or more photosensitive elements sufficiently that a substantial portion of the information content can be transmitted. Each photosensitive element of the receiver surface 340 is operatively coupled to a receiver system 350, and passes time-varying measurements indicative of the time-varying intensity of incident light to the receiver system 350. The receiver system 350 is configured to reconstruct a substantial portion of the information content from the time-varying measurements of the one or more photosensitive elements. Reconstruction can comprise correlation of the signals with portions of the information content based on functional mappings or lookup tables based on experimentation or system modeling. The receiver system outputs the reconstructed portion of the information content as an information output 355.

Example 2

Figure 4:
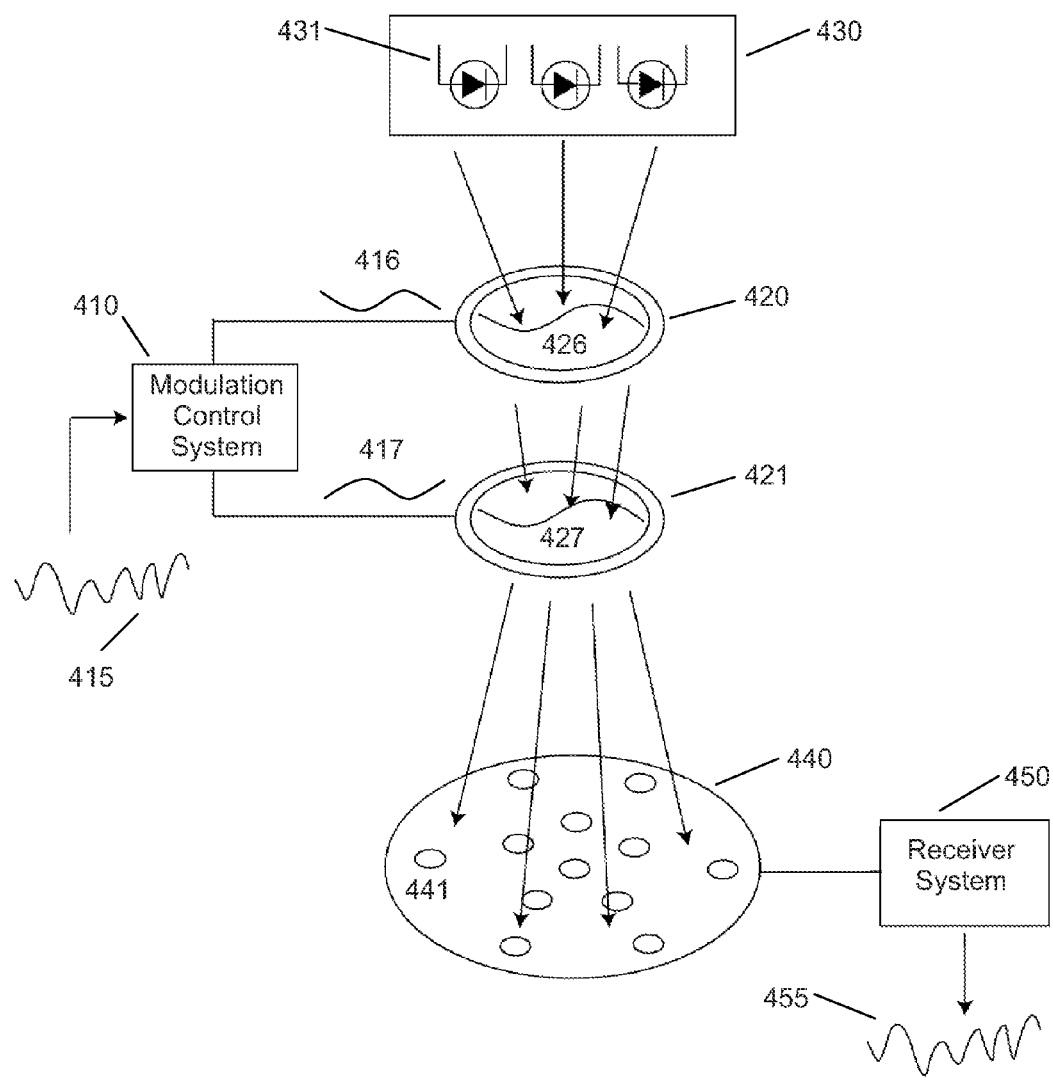
FIG. 4 illustrates a communication system according to another embodiment of the present invention.

FIG. 4 illustrates a communication system comprising a series of liquid lenses modulating light in an illumination system according to one embodiment of the present invention. A modulation control system 410 is configured to read an analog information content 415, for example through electronic means (not shown), and drive the liquid lenses in a manner representative thereof. The modulation control system 410 is operatively coupled to each of liquid lenses 420 and 421. A first time-varying electrical signal 416 is fed to the electrodes of a first liquid lens 420, the signal 416 being configured to induce a corresponding time-varying configuration 426 of the surface of the liquid lens, the time varying configuration 426 comprising one or more resonant modes. A second time-varying electrical signal 417 is fed to the electrodes of a second liquid lens 421, the signal 417 being configured to induce a corresponding time-varying configuration 427 of the surface of the liquid lens, the time varying configuration 427 comprising one or more resonant modes. Due to the operation of the modulation control system 410, the information content 415 is encoded in the combination of the three-dimensional time-varying configurations 426 and 427 of the liquid lenses. For example, the first time-varying signal 416 can comprise a preconfigured signal, while the second time-varying signal 417 can comprise a phase-shifted signal substantially based on a preconfigured signal, where the relative phase between the two time-varying signals 416 and 417 is substantially proportional to the amplitude of the information content 415 at a given time.

Continuing with reference to FIG. 4, the liquid lenses are serially optically coupled to a light source 430 of an illumination system, the light source comprising light-emitting elements such as LEDs, for example LED 431. Light from the light source 430 passing through the liquid lens 420 is refracted by the surface thereof in a manner that varies with the time-varying configuration 426. Portions of the refracted light then pass through the liquid lens 421 where the light is further refracted by the surface thereof in a manner that varies with the time-varying configuration 427. This action modulates light passing through the liquid lens, which falls incident on a receiver surface 440. The receiver surface 440 comprises one or more photosensitive elements, such as element 441, configured to measure the time-varying intensity of light incident thereupon. The size and three-dimensional placement of the receiver surface 440, and the number and three-dimensional placement of the photosensitive elements thereof are selected such that light modulated by the liquid lenses can be discriminated by the one or more photosensitive elements sufficiently that a substantial portion of the information content can be transmitted. Each photosensitive element of the receiver surface 440 is operatively coupled to a receiver system 450, and passes time-varying measurements indicative of the time-varying intensity of incident light to the receiver system 450. The receiver system 450 is configured to reconstruct a substantial portion of the information content from the time-varying measurements of the one or more photosensitive elements. Reconstruction can comprise correlation of the signals with portions of the information content based on functional mappings or lookup tables based on experimentation or system modeling. The receiver system outputs the reconstructed portion of the information content as an information output 455.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Also, the reference numerals in the claims are merely for convenience and are not to be read in any way as limiting.

I claim:

1. An apparatus for communicating information content by modulation of light in an illumination system, the apparatus comprising:
    a liquid lens optically coupled to the illumination system and capable of modulation of light thereof, the liquid lens having one or more resonance modes;
    a modulation control system operatively coupled to the liquid lens and receiving the information content, the modulation control system being configured to represent at least a portion of the information content as a time-varying configuration of the liquid lens, the time-varying configuration substantially including one or more of said one or more resonance modes of a higher order than a 01 mode; and
    a receiver system optically coupled to the liquid lens, the receiver system being configured to decode at least a portion of the information content from a light modulated by the time-varying configuration of the liquid lens.

2. The apparatus of claim 1, wherein the time-varying configuration includes an orientation of the liquid lens with respect to a light emitted by the illumination system.

3. The apparatus of claim 1, wherein the time-varying configuration includes an electric potential at different points on a surface the liquid lens.

4. The apparatus of claim 1, wherein the receiver system further comprises
    a) a photosensitive surface configured to respond to the light by emitting a signal indicative of a property of the light; and
    b) a processing unit adapted to decode at least the portion of the information content from the signal.

5. The apparatus of claim 4, wherein the processing unit decodes the portion of the information content using a look-up table.

6. The apparatus of claim 1, wherein the illumination system includes one or more LED-based lighting units.

7. A method for communicating information content by modulation of light in an illumination system, the method comprising:
    providing a liquid lens optically coupled to the illumination system and capable of modulation of light thereof, the liquid lens having one or more resonance modes;
    inducing a time-varying configuration of the liquid lens, the time-varying configuration substantially including one or more of said one or more resonance modes of a higher order than a 01 mode, the time-varying configuration representing information content as modulated light of the illumination system; and
    decoding at least a part of the information content from the modulated light.

8. The method of claim 7, wherein the decoding step comprises:
    a) sensing the modulated light to produce a signal; and
    b) comparing the signal with a look-up table.

* * * * *